(12) United States Patent
Volpe

(10) Patent No.: US 10,901,917 B1
(45) Date of Patent: Jan. 26, 2021

(54) ADDRESS SCRAMBLING FOR STORAGE CLASS MEMORY

(71) Applicant: Amazon Technologies, Inc., Seattle, WA (US)

(72) Inventor: Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 345 days.

(21) Appl. No.: 15/881,577

(22) Filed: Jan. 26, 2018

(51) Int. Cl.
*G06F 12/14* (2006.01)
*G06F 9/455* (2018.01)

(52) U.S. Cl.
CPC ...... *G06F 12/1408* (2013.01); *G06F 9/45558* (2013.01); *G06F 2009/45583* (2013.01); *G06F 2212/1052* (2013.01)

(58) Field of Classification Search
CPC ...... G06F 12/00; G06F 12/14; G06F 12/1408; G06F 9/45558
See application file for complete search history.

(56) References Cited

U.S. PATENT DOCUMENTS

| | | | | |
|---|---|---|---|---|
| 8,140,862 B2* | 3/2012 | Yamaguchi | ......... | G06F 12/1408 713/193 |
| 2001/0037450 A1* | 11/2001 | Metlitski | ............... | G06F 21/123 713/152 |
| 2003/0141994 A1* | 7/2003 | Ishioka | ............... | G06F 12/1408 341/50 |
| 2004/0260934 A1* | 12/2004 | Proll | ........................ | G11C 7/24 713/193 |
| 2005/0010789 A1* | 1/2005 | Liang | .................. | G06F 12/1408 713/189 |
| 2007/0143568 A1* | 6/2007 | Gould | ................. | G06F 12/0646 711/203 |
| 2009/0113217 A1* | 4/2009 | Dolgunov | ........... | G06F 12/1408 713/190 |
| 2013/0205139 A1* | 8/2013 | Walrath | .................. | G06F 21/72 713/190 |
| 2014/0047549 A1* | 2/2014 | Bostley, III | ............. | G06F 21/60 726/26 |
| 2014/0115292 A1* | 4/2014 | Mclachlan | .............. | G06F 12/02 711/170 |
| 2014/0173692 A1* | 6/2014 | Srinivasan | ............ | H04W 12/02 726/4 |

(Continued)

*Primary Examiner* — Khang Do
(74) *Attorney, Agent, or Firm* — Weaver Austin Villeneuve & Sampson LLP

(57) ABSTRACT

In various implementations, a memory controller for storage class memory can include an address scrambling circuit. The address scrambling circuit can receive an input address for a processor memory transaction, where the input address is associated with a virtual machine identifier. The address scrambling circuit can further determine an address scrambling mapping from the plurality of address scrambling mappings, where the address scrambling mapping includes a first pattern that determines an alternate set of bits for a set of input bits. The address scrambling circuit can further scramble, using the scrambling circuit and the first pattern, a first part of the input address. The address scrambling circuit can further determine a scrambled address using the input address and the scrambled first part of the input address and output the scrambled address.

17 Claims, 9 Drawing Sheets

(56) References Cited

U.S. PATENT DOCUMENTS

| | | | |
|---|---|---|---|
| 2014/0237307 A1* | 8/2014 | Kobla | G11C 29/18 714/723 |
| 2015/0161059 A1* | 6/2015 | Durham | G06F 12/0868 713/193 |
| 2017/0169255 A1* | 6/2017 | Lin | G06F 12/14 |
| 2017/0285976 A1* | 10/2017 | Durham | G06F 21/64 |
| 2019/0004843 A1* | 1/2019 | Durham | G06F 9/45558 |
| 2019/0107957 A1* | 4/2019 | Helmick | G06F 3/0688 |
| 2019/0370189 A1* | 12/2019 | Wang | G11C 8/20 |
| 2020/0226074 A1* | 7/2020 | Durham | G06F 12/145 |

* cited by examiner

ADDRESS SCRAMBLING FOR STORAGE CLASS MEMORY

BACKGROUND

Storage class memory is a type of memory made from flash-based memory cells. Storage class memory can have read performance that is comparable to Dynamic Random Access Memory (DRAM) and write performance that is significantly faster than technologies used for hard drives. Storage class memory can thus be used for processor memory, in place of or in addition to DRAM and dynamic RAM based technologies, which have been the primary technologies used for processor memory.

A memory controller for storage class memory can include security features. The security features can make snooping processor memory transactions a far less effective technique for hacking the system. The security features can be combined with techniques that can be used to obtain better utilization of storage class memory.

BRIEF DESCRIPTION OF THE DRAWINGS

Various embodiments in accordance with the present disclosure will be described with reference to the drawings, in which.

DETAILED DESCRIPTION

Figure 1:
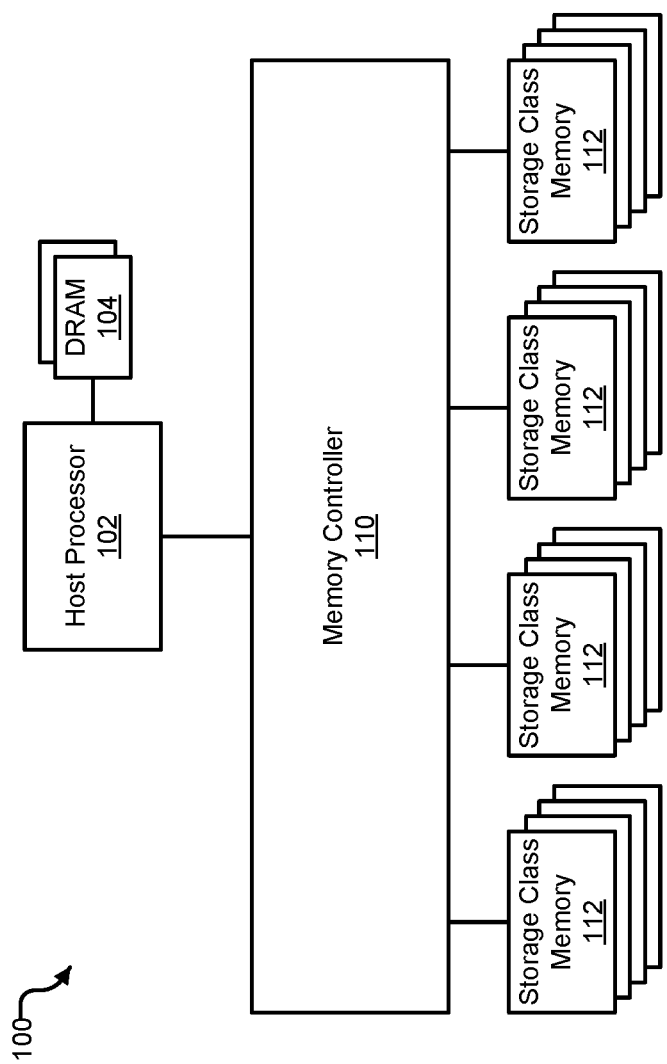
FIG. 1 illustrates an example of a processor architecture that includes a large amount of processor memory.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Server designs can require that the server's processor have access to vast amounts of processor memory. Processor memory is the memory that is most local to the processor, and which the processor uses for data that the processor is or will immediately act on. For example, the processor memory is where executing parts of an operating system can be stored, as well as the code for currently executing applications. In contrast, storage memory, such as disk drives, can be used by the processor to store data that the processor is not currently acting on. Most often, the processor memory is accessible to the processor over a host bus that is directly connected to the processor. Processor memory can also be referred to as main memory.

Server processors can have many cores, executing many individual execution threads. For example, a server processor can have 64 or more cores, executing a total of 128 or more threads. To support these cores and execution threads, the processor needs large amounts of processor memory, enough so that applications executing on the processor do not experience noticeable lag (e.g., noticeable to a user of the applications) due to data needing to be moved between processor memory and storage memory.

Dynamic Random Access Memory (DRAM) and variations of DRAM are often used for processor memory because DRAM can be high capacity for low cost. Using DRAM, a server can be equipped with on the order of 256 gigabytes (GB) to 512 GB or more of processor memory, for example.

There are some limitations to DRAM, however. For example, the amount of memory that can be included in a single physical DRAM chip may be limited to the degree to which the DRAM storage cells can be shrunk. At some point, the limitations of physics and the ability to store or move electrons between molecules will become an obstacle. As another example, there are practical limitations to the number of DRAM cards that can be put into a server system. Assuming, for example, that a DRAM card is one half inch wide and six inches long, sixteen DRAM cards could require a board space that is eight inches wide and six inches long. In this example, increasing the amount of DRAM can lead to issues with routing signals between the DRAM and the processor, having to increase the size of the board to accommodate more DRAM cards, having to increase the size chassis to fit the larger boards and accompanying DRAM, cooling issues, and possible other issues.

One solution for increasing the memory that is available to a processor is to store data in storage memory, such as solid state drives and other hard drives. Accessing storage memory can be very slow, however, thus a processor will store data in storage memory that the processor does not have immediate need for. Additionally, to reduce negative effect of storage memory latency, a processor will execute a block operations to storage, where a set of multiple, sequential addresses are read or written in the same operations.

Other memory storage technologies are thus being used to extend the amount of processor memory that is available to a processor. One such technology is storage class memory. Storage class memory (SCM) uses flash-based NAND technology that can have read performance similar to DRAM and write performance that is significantly faster than technologies used for hard drives. For example, a solid state drive can require on the order of 0.1 milliseconds (ms) to read, while storage class memory can require 300-500 nanoseconds (ns) to read. The speed of storage class memory brings such memory into the range of speed of DRAM, enabling load-store operations (the moving of data from memory to a processor's registers) as well as block operations. Storage class memory can also be much denser than DRAM. For example, a single DRAM card can have on the order of 64 GB of memory capacity, while a single storage class memory card can have on the order of 2 terabytes (TB) of memory capacity.

Storage class memory, however, does have limitations. For example, some types of storage class memory technologies "wear" over time, and loses the ability to store data.

Repeated program cycles (e.g., writing of data to a memory cell) can eventually cause the physical structure of the transistors that make up the memory to break down and lose the ability to store data. For example, some flash technologies can withstand a million or more program cycles before becoming unreliable.

To extend the life of storage class memory, a memory controller for the storage class memory can include wear leveling. Wear leveling attempts to arrange data so that writes are distributed evenly across available memory. Distributing writes can reduce the possibility that a single block should fail due to undergoing a high concentration of program cycles. Wear leveling can include dynamic wear leveling, in which each time data is re-written to the memory, the data is written to a new location. Wear leveling can also include static wear leveling, where static blocks that do not change are periodically moved so that the cells occupied by the static blocks can be used by other data.

In addition to tasks such as wear leveling, a memory controller for storage class memory can assist in making storage class memory usable as processor memory. For example, the memory controller can manage the multiples of terabytes of address space that can be provided by storage class memory in an efficient manner, so that neither the processor nor software needs to be occupied making sure that the memory is being used well. As a further example, the memory controller can manage write failures that can occur with storage class memory, can provide memory address security, data encryption, memory usage statistics, and can hide wear leveling activities from the processor, so that the processor can use storage class memory in the same manner as DRAM.

Because of concerns such as memory wear, efficient use of storage class memory is a consideration for server and network architects. For example, distributing memory usage across the available storage class memory and avoiding concentrated use of any one part of the storage class memory can extend the life of the memory. Spreading transactions across available storage class memory can have the added benefit of increasing the aggregate bandwidth to and from the memory, and can lower the average latency for memory accesses. As another example, as parts of the storage class memory become unusable, virtual machines and other applications using the memory should continue to have access to a fair share of the memory.

Another concern for network administrators is security on a server. Though data written to and from processor memory can be encrypted, by spying on the addresses used to read or write the data, a malicious actor may be able to figure out where important data is stored. For example, when a virtual machine starts up, the virtual machine can be expected to execute boot code, the execution of which can involve a particular sequence of writes and reads to processor memory. In this example, by observing the sequence, a malicious actor may be able to hack the virtual machine by writing data into the processor memory and interfering with the boot code.

In various implementations, a memory controller for storage class memory can include an address scrambling circuit that can receive an input addresses for memory transactions, and can output a scrambled version of the input address. In various implementations, the address scrambling circuit can scramble the input address according to a pattern, where the pattern can be determined using a random number. When the server system can host multiple virtual machines, a different pattern can be assigned to each virtual machine, so that no two virtual machines use the same pattern. In various implementations, to efficiently distribute memory usage across available processor memory a separate scrambling pattern can be applied to all addresses, regardless the source of the transaction using the addresses (e.g., regardless of which virtual machine generated the transaction). For example, when reads to sequential data of a certain size (such as, for example, a cache line size) occur, a part of the addresses for the reads can be scrambled such that each read will go to a different memory bank. In various implementations, it may be desirable for all addresses assigned to a particular virtual machine to remain within the same memory block, so that the data from different virtual machines is not intermixed. In these implementations, a part of the address (e.g., a part that corresponds to a block address) can be left unscrambled.

In various implementations, to ensure a higher degree of security, the address scrambling pattern can be configured by an address scrambling configuration engine included in the memory controller. In these implementations, the scrambling pattern determined by the address scrambling configuration engine can be made inaccessible to the software executing on the system, so that even if a malicious program were to infiltrate the system, the program would not be able to decode the scrambling pattern. In some implementations, control of the scrambling pattern may be desired, in which case software, such as hypervisor, can be given the ability to program the scrambling pattern.

In addition to security, address scrambling can be beneficial to the performance of the system. For example, as noted, above, use of the processor memory can be distributed automatically, without the operating system or hypervisor needing to be involved. Distributing memory usage can reduce bottlenecks that can occur when many transactions are queued for the same memory bank. Distributing memory usage can also reduce concentrated use of any one part of the memory, so that the life of the memory can be extended.

As an added benefit, writing to the storage class memory, solely for the purpose of removing or invalidating data, can be avoided. For example, when a virtual machine is shut down, normal practice is for the processor memory used by the virtual machine be deleted or written to zero, so that the next virtual machine to use the memory does not gain access to the data. With address scrambling, however, any data left in the processor memory may be impossible to associate with a specific virtual machine or with any operation conducted by the virtual machine. The data can thus be treated as garbage or invalid data.

FIG. 1 illustrates an example of a processor architecture 100 that includes a large amount of processor memory. In the illustrated example, the processor memory includes a small amount of DRAM 104 and many banks of storage class memory 112. In other examples, other types of memory can be used in place of or in addition to storage class memory, such as more DRAM, synchronous dynamic random access memory (SDRAM), double data rate SDRAM (DDR SDRAM), DDR2, DDR3, and/or solid state memory, among other types of memory.

In the illustrated processor 102 can be a multi-core, multi-threaded processor. The processor 102 can have an address space, a part of which includes the DRAM 104 and a part of which includes the storage class memory 112. In some examples, another part of the address space of the processor can be mapped to Input/Output (I/O devices). A 64-bit processor can theoretically have an address space that includes 9,223 quadrillion individually addressable bytes, though in practice a fraction of the available address space is actually used.

The processor 102 can use the DRAM 104 for extremely latency sensitive operations, and/or for operations where the memory controller 110 may not be available. For example, code for initializing the memory controller can be stored in the DRAM 104. In some examples, the DRAM 104 can include multiple banks of DRAM cards. Each card can have, for example 64 GB of memory space. In other examples, other types of memory can be used in place of DRAM, such as DDR.

In various implementations, the memory controller 110 can manage multiple banks of storage class memory 112. Each card in the bank can have, for example, 2 TB of memory space. In some implementations, the banks of storage class memory 112 can be grouped into different memory channels, which can be individually managed by the memory controller 110. In the illustrated example, the storage class memory 112 has been organized into four memory channels. In other examples, the processor architecture 100 can include fewer or more memory channels.

In various implementations, the memory controller 110 can include one or more communication channels for communicating with the processor 102. The multiple processor communication channels can enable multiple processor cores and/or multiple threads to issue transactions to the memory controller 110 in parallel. In some cases, the processor communication channels can implement a same bus protocol or different bus protocols. Examples of bus protocols that can be used for the processor communication channel include Peripheral Component Interconnect Express (PCIe) and Intel UltraPath Interconnect (UPI). Read and write transactions from the processor 102 can have, for example, 64-bit addresses.

In various implementations, the memory controller 110 is a single integrated circuit or a combination of integrated circuits. The memory controller 110 can be implemented in, for example, an Application Specific Integrated Circuit (ASIC), a Field Programmable Gate Array (FPGA), or a System-on-a-Chip (SoC). In some implementations, the memory controller 110 can reside on a separate card that can be installed on a motherboard that includes the processor 102. In some implementations, the memory controller 110 can be installed on the same board as the processor. In some implementations, the memory controller 110 can be part of the same integrated circuit as the processor 102.

Figure 2:
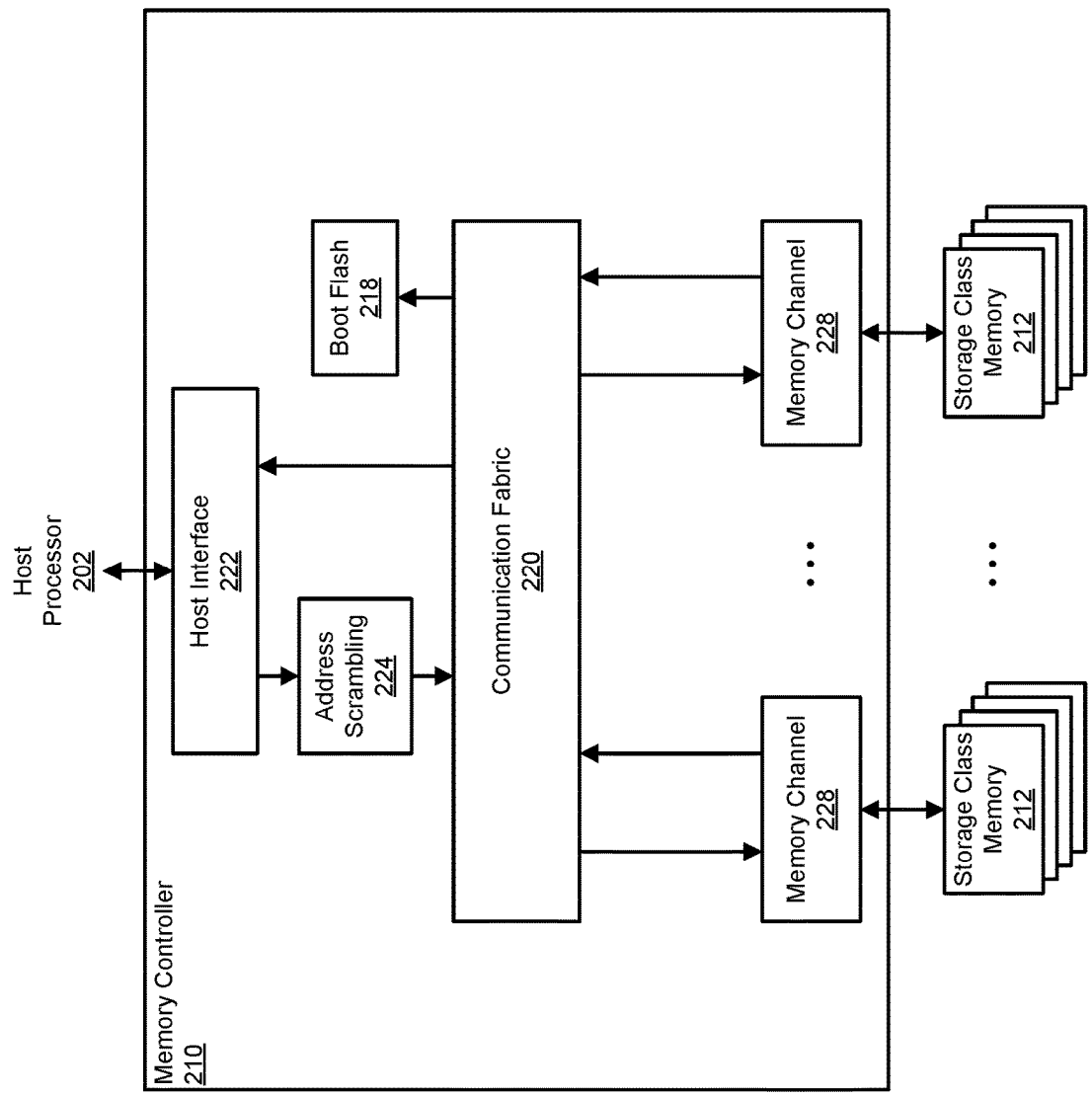
FIG. 2 illustrates an example of a memory controller that can be used in the processor architecture illustrated in FIG. 1.

FIG. 2 illustrates an example of a memory controller 210 that can be used in the processor architecture 100 illustrated in FIG. 1. As illustrated by the example of FIG. 2, the memory controller 210 can include a host interface 222 for communicating with a host processor 202. As noted above, the host interface 222 can include multiple communication channels (which can be referred to as links) with the host processor 202. The memory controller 210 can further include a communication fabric 220 through which internal components of the memory controller 210 can communicate. The communication fabric 220 can be implemented using a standardized protocol such as Advanced Extensible Interface (AXI) or a variation of AXI, or a proprietary protocol. The memory controller 210 can further include one or more memory channels 228, through which the memory controller 210 can control banks of storage class memory 212, with each memory channel 228 managing a set of banks. In various implementations, the memory controller 210 can also include a boot flash 218, a flash memory that can store information such as code for any microcontrollers in the memory controller 210. In examples where the memory controller 210 is implemented as an FPGA, the boot flash 218 can alternatively or additionally include the FPGA image for the memory controller 210.

In various implementations, the memory controller 210 can include an address scrambling 224 circuit. In the illustrated example, the address scrambling 224 circuit is placed in the path of communication channel between the host interface 222 and the communication fabric 220. In this example, addresses for all transactions on the communication channel can be scrambled before the transaction is transferred to a memory channel 228. In implementations where the memory controller 210 and the host processor 202 communicate over multiple communication channels, the memory controller 210 can have an address scrambling 224 circuit in the path of each channel. Addresses input into the address scrambling 224 circuit can be valid addresses anywhere in the address space of the host processor 202. Addresses output from the address scrambling 224 circuit can be valid addresses anywhere in the address space of the storage class memory 212, and can be used by the memory channels 228 to access the storage class memory 212. In some implementations, the addresses from the address scrambling 224 can be used to indirectly access the storage class memory 212. For example, the memory controller 210 can include an address translation circuit, which can produce a translated address from a scrambled address. In this example, the translated address can be used to access the storage class memory 212.

In various implementations, each memory channel 228 maintains a set of memory banks, which constitute a portion of all the memory that the memory controller 210 makes available to the host processor 202. In some implementations, the memory controller 210 can include address translation circuit for the memory channels 228. In some examples, the memory controller 210 can include an address translation circuit for each memory channel 228. The address translation circuit can hide memory management operations, such as wear leveling, from the host processor 202.

Figure 3:
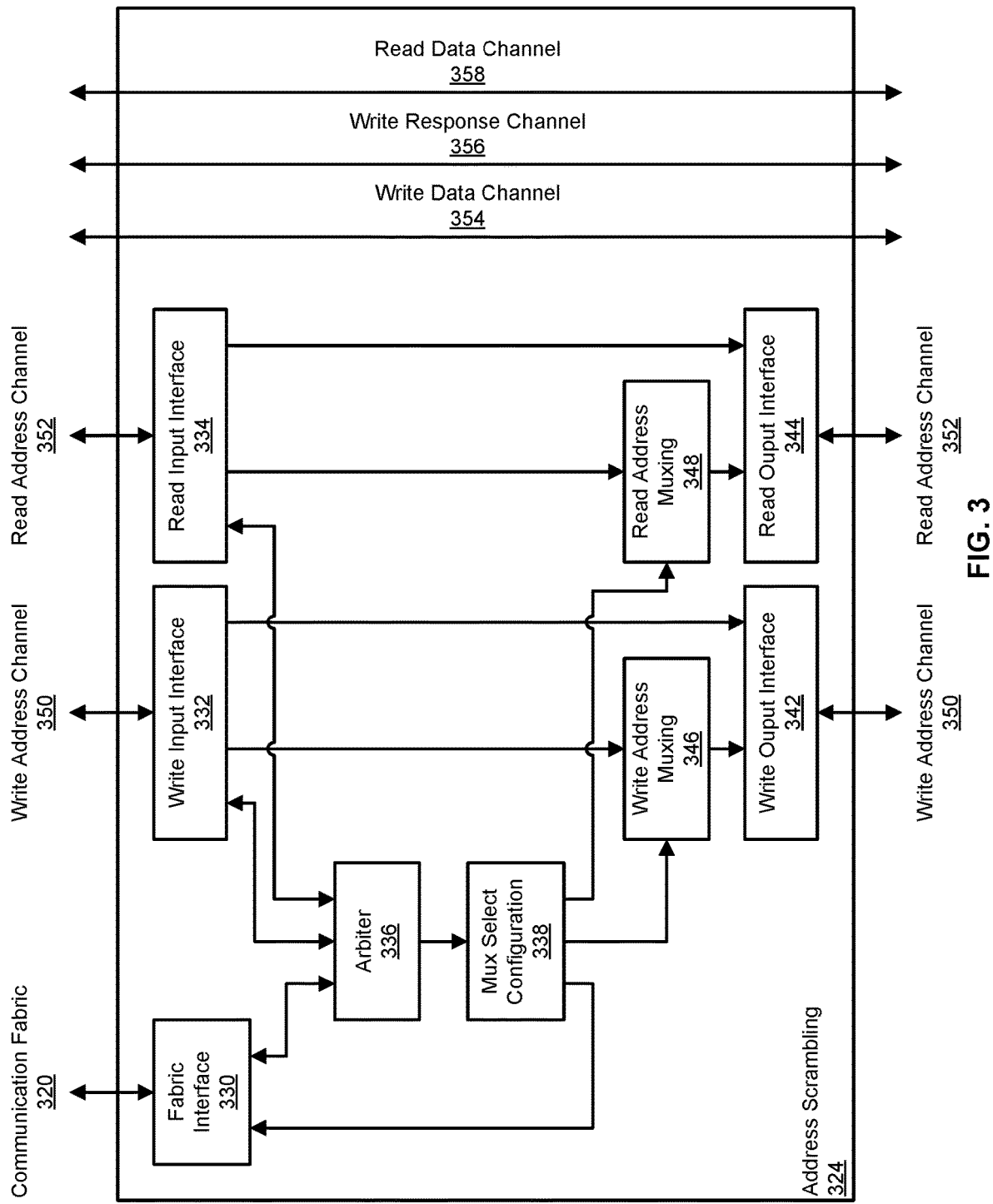
FIG. 3 illustrates in greater detail an example of an address scrambling circuit.

FIG. 3 illustrates in greater detail an example of an address scrambling 324 circuit. As discussed above, the example address scrambling 324 circuit can produce a scrambled address from an input address. For storing scrambling patterns, the address scrambling 324 circuit can include a mux select configuration 338 memory, which can store different scrambling patterns for different applications. The address scrambling 324 circuit can receive transactions through a write input interface 332 or a read input interface 334, and can output scrambled addresses through a corresponding write output interface 342 or read output interface 344. An arbiter 336 can coordinate between requests received through the write input interface 332, read input interface 334, or through a fabric interface 330.

In various implementations, the write input interface 332 and write output interface 342 are in the path of a write address channel 350 between a host processor and storage class memory. Similarly, the read input interface 334 and read output interface 344 are in the path of a read address channel 352 between the host processor and storage class memory. The write address channel 350 and read address channel 352 can be routed through a communication fabric 320, and could possibly also pass through other blocks in a memory controller, but addresses on each channel are part of transactions that originate with the host processor. In various implementations, write output interface 342 and read input interface 334 can be "slave" interfaces, in that these interfaces implement the part of a communication protocol that makes these interfaces targets or recipients of addresses.

On the output side of the address scrambling 324 circuit, the write address channel 350 and read address channel 352 can also be routed through the communication fabric 320 or can be connected directly to a memory channel. In various implementations, the write output interface 342 and read output interface 344 can implement the part of a communication protocol that makes these interfaces "masters," or interfaces capable of initiating or driving transactions.

In the illustrated example, the system includes separate channels for write addresses and read addresses. In other examples, write and read addresses can be transferred over the same channel (e.g., the same bus or set of wires).

Write transactions can also include write data and write responses, and read transactions can include read data. In the illustrated example, the write data is transferred from the host processor to memory on a write data channel 354, write responses (e.g., success or failure indicators, error indicators, etc.) are transferred from memory to the host processor over a separate write response channel 356, and data read from memory is also transferred over a separate read data channel 358. The example address scrambling 324 circuit does not operate on the data part of a transaction, thus these data channels pass through the circuit to rejoin the address channels on the output side of the circuit. In various implementations, on the host processor side of the address scrambling 324 circuit, the write data channel 354, write response channel 356, and read data channel 358 can be routed through the communication fabric 320 prior to being input into the address scrambling 324 circuit, though the data on these channels originate from or end up at the host processor. On the output side of the address scrambling 324 circuit, the data channels can also be routed through the communication fabric 320 prior to reaching the storage class memory, or can be input into or output from another block in the memory controller.

In other examples, both read and write data can be transferred over a same data channel. In some examples, write response data can also be transferred over the same data channel. In some examples, there may be no write response data.

In various implementations, the address scrambling 324 circuit can also include a fabric interface 330 that enables host processor access to the address scrambling 324 circuit and for the address scrambling 324 circuit to be able to communicate with other blocks in the memory controller. For example, when a hypervisor is allowed to program scrambling patterns, transactions from hypervisor can be received at the fabric interface 330. As another example, when the memory controller includes an address scrambling configuration engine, the address scrambling configuration engine can write the pattern to the address scrambling 324 through the fabric interface 330. Other examples of transactions that can be received at the fabric interface 330 include configuration writes from the host processor or from other blocks in the memory controller.

In various implementations, the arbiter 336 can determine which of the write input interface 332, the read input interface 334, or the fabric interface 330 should be serviced next. For example, when all three interfaces are requesting access to the mux select configuration 338 memory, the arbiter 336 can use a round-robin method to give each interface a turn. In this example, interfaces that are waiting can be stalled until their turn is up. In some implementations, requests from the write input interface 332 and the read input interface 334 are always assumed to be requests to read the mux select configuration 338 memory, while requests received over the fabric interface 330 can be read or write requests directed to the mux select configuration 338 memory.

When the arbiter 336 selects the write input interface 332 or the read input interface 334, a write or read address input through these interfaces can be scrambled. In some examples, the mux select configuration 338 memory includes at least as many entries as there are virtual machines that can be supported by the system, so that the mux select configuration 338 memory can store a different pattern for each virtual machine. In some implementations, the mux select configuration 338 memory includes additional entries. In these implementations, the additional entries can be used for, for example, storing a scrambling pattern that can be applied to all input addresses, or storing a non-scrambling pattern, that is, a pattern that causes no scrambling to happen, among other possibilities. In some implementations, the mux select configuration 338 memory cannot be read by software, including a hypervisor and the system's operating system, and can only be read by certain hardware components of the memory controller (such as a scrambling configuration engine).

In various implementations, an input address received over the write input interface 332 or read input interface 334 can be accompanied by virtual machine identifier. For example, the write address channel 350 and the read address channel 352 can include a separate set of signals for transmitting a virtual machine identifier. Alternatively, in some implementations, the virtual machine identifier can be determined from the input address. In these implementations, the arbiter 336 circuit can, for example, have a map of virtual machine address spaces (e.g., the physical addresses assigned to a virtual machine) to virtual machine identifiers. In some implementations, the virtual machine identifier can be determined directly from the machine physical address. For example, virtual machine address spaces can be assigned such that the virtual machine identifier resides in certain bits of the input address, or correlate to certain bits in the input address.

In various implementations, the virtual machine identifier can be used to read the mux select configuration 338 memory. The scrambling pattern read from the mux select configuration 338 memory can be input into the write address muxing 346 block when the inbound transaction was received on the write channel and into the read address muxing 348 block when the transaction was received on the read channel. The scrambling pattern is input into the select input of the muxing blocks.

In various implementations, the write address muxing 346 and the read address muxing 348 are multiplexors with an equal number of input signals and output signals. The write address muxing 346 block and the read address muxing 348 block can receive as inputs the input address received at the write input interface 332 or read input interface 334, respectively. In various implementations, both muxing blocks are able to, for each output signal, select any of the input signals. In these implementations, the input signal selected for an output signal is determined by the scrambling pattern. The outputs from the write address muxing 346 and read address muxing 348 can be input into the write output interface 342 and the read output interface 344, respectively, for outputting onto the write address channel 350 and read address channel 352. In some implementations, some signals from the write address channel 350 and read address channel 352, such as address valid signals, pass directly from the input interfaces to the output interfaces, unmodified.

In some implementations, the address scrambling 324 circuit can be configured to bypass scrambling. For example, a bit in the input address can be set (e.g., one that is outside of the usable address range), which the address scrambling 324 circuit can interpret to mean that scrambling should be disabled. As another example, the address scrambling 324 circuit can be configured with a range of addresses that should not be scrambled. As another example, the address scrambling 324 circuit can be configured to bypass scrambling for certain virtual machine identifiers. When scrambling is bypassed, the input address passes through the muxing blocks without modification. To enable bypassing, in some examples, an entry in the mux select configuration 338 circuit can reserved, and can contain a pattern that causes the muxing blocks to select a corresponding input signal for each output signal (e.g., output 0 selects input 0, output 1 selects input 1, etc.).

Requests received at the fabric interface 330 can be request to read or write the configuration 338 memory, and/or to modify the configuration of the arbiter 336.

When a request is received over the fabric interface 330 is a read request, the arbiter 336 can send the request to the mux select configuration 338 memory, and direct the mux select configuration 338 memory to return the read data to the fabric interface 330. In some implementations, only the hardware of the memory controller is able to read the mux select configuration 338 memory. In some implementations, privileged software, such as the hypervisor, can read the mux select configuration 338 memory.

A request to write to the mux select configuration 338 memory can be to configure a new scrambling pattern or to modify an existing scrambling pattern. In various implementations, the arbiter 336 can send the write request to the mux select configuration 338 memory, and can direct the mux select configuration 338 memory to send a response, if any, to the fabric interface 330. In some implementations, only the hardware of the memory controller is able to write the mux select configuration 338 memory. In some implementations, privileged software, such as the hypervisor, can write or read the mux select configuration 338 memory.

Write requests to configure the arbiter 336 can be, for example, to configure a global scrambling pattern (discussed further below), to enable or disable scrambling for a virtual machine identifier, to associate address ranges with virtual machines, and/or other configuration operations.

Figure 4:
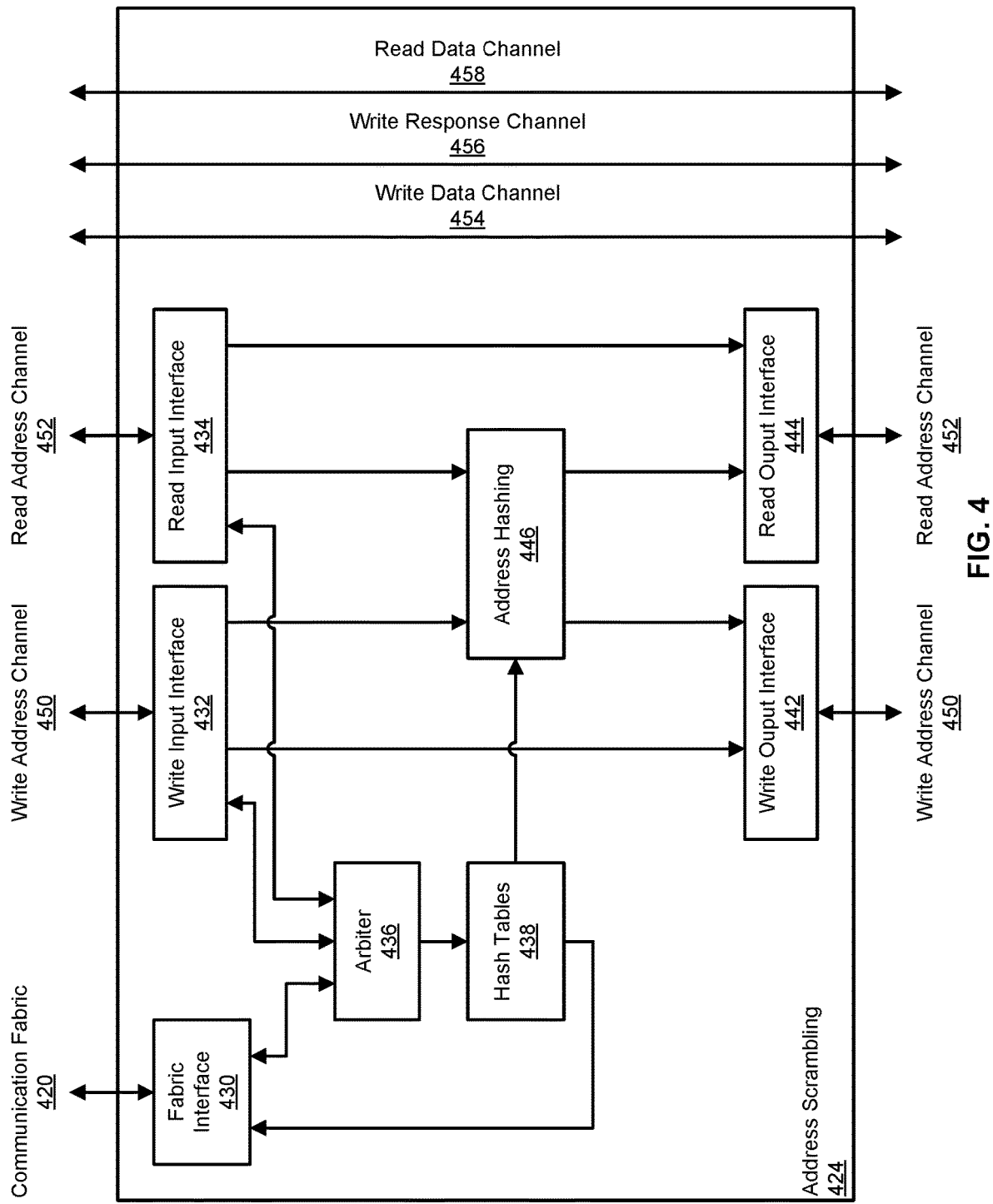
FIG. 4 illustrates another example of an address scrambling circuit.

FIG. 4 illustrates another example of an address scrambling 424 circuit. In this example, the address scrambling 424 circuit can produce a scrambled address, but instead of using multiplexors to scramble the input address, the address scrambling 424 circuit uses hashing. Hashing can be used, for example, when the memory controller has an odd number of memory channels and/or memory banks per channel, for which hashing can better enable striping addresses across memory channels or banks. In some implementations, hashing and muxing can be combined. For example, a part of the input address can be muxed to produce a scrambled value, and a part can be hashed.

To store hash values, the address scrambling 424 can include hash tables 438. The hash tables 438 can be implemented using a memory or another circuit structure. The address scrambling 424 circuit can receive transactions through a write input interface 432 or a read input interface 434, and can output scrambled addresses through a corresponding write output interface 442 and read output interface 444. An arbiter 436 can coordinate between addresses received through the write input interface 432, read input interface 434, or through a fabric interface 430.

In various implementations, the write input interface 432 and write output interface 442 are in the path of a write address channel 450 between a host processor and storage class memory. Similarly, the read input interface 434 and read output interface 444 are in the path of a read address channel 452 between the host processor and storage class memory. In some implementations, the system does not include separate write and read channels, and can instead transfer both read and write addresses over a same address channel.

Write transactions can also include write data and write responses, and read transactions can include read data. In the illustrated example, the write data is transferred from the host processor to memory on a write data channel 454, write responses are transferred from memory to the host processor over a separate write response channel 456, and data read from memory is also transferred over a separate read data channel 458. The example address scrambling 324 circuit does not operate on the data part of a transaction, thus these data channels pass through the circuit to rejoin the address channels on the output side of the circuit. In other examples, both read and write data can be transferred over a same data channel. In some examples, write response data can also be transferred over the same data channel. In some examples, there may be no write response data.

In various implementations, the address scrambling 424 circuit can also include a fabric interface 430 that enables host processor access to the address scrambling 424 circuit and for the address scrambling 424 circuit to be able to communicate with other blocks in the memory controller. For example, the hash tables 438 can be programmed through the fabric interface 430, for example by a hypervisor or by an address scrambling configuration engine.

In various implementations, the arbiter 436 can determine which of the write input interface 432, the read input interface 434, or the fabric interface 430 should be serviced next. In some implementations, requests from the write input interface 432 and the read input interface 434 are always assumed to be requests to read the hash tables 438, while requests received over the fabric interface 430 can be read or write requests directed to the hash tables 438.

When the arbiter 436 selects the write input interface 432 or the read input interface 434, a write or read address provided through these interfaces can be scrambled. In various implementations, an input address received over the write input interface 432 or read input interface 434 can be accompanied by a virtual machine identifier. In various implementations, the virtual machine identifier can be used to read a hash table from hash tables 438. In various implementations, the hash tables 438 can store a table of hash values for each virtual machine that can be supported by the system. In some implementations, the size of the hash tables, and hence the number of hash values that a table can contain, can be configured by software. A hash table read from the hash tables 438 can be input into an address hashing 446 circuit.

In various implementations, the address hashing 446 circuit can apply values from a hash table to an input address from the write input interface 432 or the read input interface 434. Various techniques can be used to apply hash values to the input address. For example, the hash table can include sixteen 4-bit values (e.g., all possible combinations of 4-bit values) in a random order. In this example, one or more 4-bit parts of the input address can be modified by swapping the 4-bit parts for values from the table. For example, a mask stored with the hash table in the hash tables 438 can indicate that bits [43:20] (bits 43 through 20, inclusive) of the address should be scrambled. In this example, bits [23:20] can be used as an index into the sixteen entry hash table. The value stored in the hash table at the indexed entry can then be swapped for bits [23:20] in the input address. The process can then be repeated for bits [27:24], then bits [31:28], and so on until bits [43:40]. In some examples, a mapping, possibly stored in the hash tables 438, can determine the bits of the scrambled address that should receive which bits of the input address. For example, to continue the previous example, the mapping can indicate that bits [43:20], after scrambling, should be placed into bits [41:18] of the scrambled address.

In the example described above, the hash table can be configured with a different width (e.g., the number of bits in each entry) and a corresponding number of entries. In some examples, a smaller number of bits can be modified using the same hash table. For example, 2-bit values can be used to index one of four entries in a sixteen-entry table, and two bits from the indexed entry can be used as the new 2-bit value for the scrambled address.

In some examples, the mask that identifies the bits to scramble can also indicate bits that should not be scrambled, and should instead be copied directly into the scrambled address. In some cases, the bits can be copied to a different location than the location of the bits in the input address.

The scrambled address produced by the address hashing 446 circuit can be output to the write output interface 442 or the read output interface 444, depending on whether the inbound transaction was received on the write channel or the read channel. In some implementations, other data in the write address channel 450 or the read address channel 452, such as address ready signals, are not scrambled, and can pass directly from the input interfaces to the output interfaces.

In some implementations, the address scrambling 424 circuit can be configured to bypass scrambling. For example, a bit in the input address, one outside the useable address range, can be used to indicate that the address should not be scrambled, or the arbiter 436 can be programmed to bypass scrambling for all addresses from a particular virtual machine or within a particular address range.

Requests received over the fabric interface 430 can include requests to read values from the hash tables 438, write new values into the hash tables 438, and/or to configure the arbiter 436. In some implementations, only the hardware of the memory controller is able to read or write the hash tables 438. In some implementations, privileged software, such as the hypervisor, can read the hash tables 438.

When a request is received over the fabric interface 430 is a read request, the arbiter 436 can send the request to the hash tables 438, and direct hash tables 438 to return the read data to the fabric interface 430. Similarly, write requests received over the fabric interface 430 can be sent to the hash tables 438, with any writer response being returned to the fabric interface 430.

Write requests to configure the arbiter 436 can be, for example, to enable or disable scrambling for a virtual machine identifier, to associate address ranges with virtual machines, and/or other configuration operations.

Though illustrated as separate examples, in other examples, an address scrambling circuit can include both muxes and hash tables. In these examples, one part of an address can be scrambled using muxing and another part of the same address can be scrambled using hash tables. Additionally or alternatively, muxing or scrambling can be selectively disabled for some addresses (e.g., for specific virtual machines) and/or for all addresses.

Figure 5:
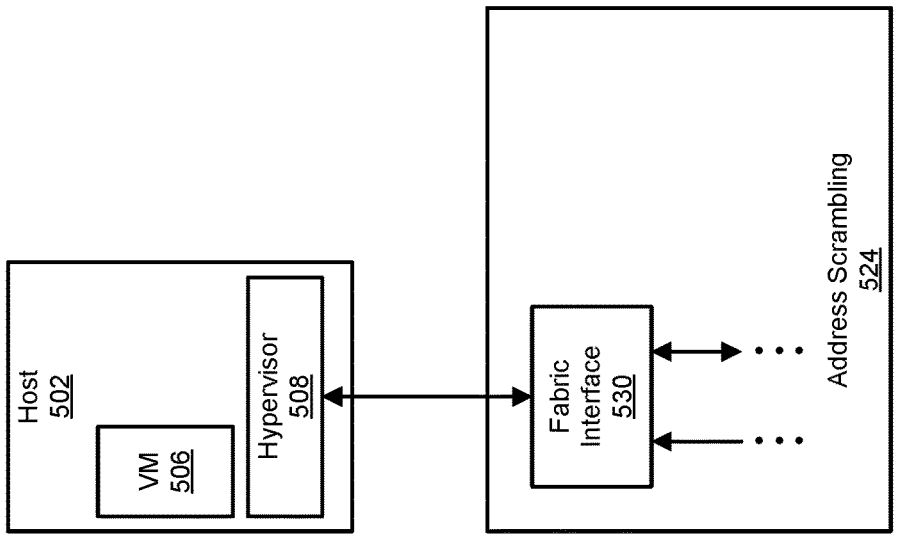
FIG. 5 illustrates an example of a method by which an address scrambling circuit can be configured.

FIG. 5 illustrates an example of a method by which an address scrambling 524 circuit can be configured. Configuring the address scrambling 524 circuit can include storing new address scrambling patterns in the memory of the address scrambling 524 circuit. The address scrambling 524 can be part of a memory controller that manages multiple banks of storage class memory. In this example, components of the address scrambling 524 circuit have been omitted, for clarity.

In the example illustrated in FIG. 5, the address scrambling 524 circuit is being configured by a hypervisor executing in a host 502 environment. The host 502 environment, in this context, can describe the software executing on a host processor. The host 502 environment can include, for example, an operating system, on top of which the hypervisor 508 can run. Alternatively, the hypervisor 508 can be a component of the operating system or the operating system can be integrated into the hypervisor 508. The host 502 environment can also include one or more virtual machines 506 (VMs) that are being managed by the hypervisor 508.

When the hypervisor 508 launches a new virtual machine 506, the hypervisor 508 can determine an address scrambling pattern for the virtual machine 506. As discussed further below, the address scrambling pattern can include a global pattern, which can apply to all addresses in the processor memory address space, and a virtual machine-specific pattern, which applies only to addresses assigned to the virtual machine. In various implementations, the hypervisor 508 can use a random number generator, which may be built into the hypervisor 508, to determine the patterns.

In other examples, the hypervisor 508 can determine hash values for the virtual machine 506, and can generate a hash table with randomized hash values. For example, when the hash table is configured to have eight entries, the hypervisor 508 can place the numbers 0 through 7 into the table in a random order. In these examples, the hypervisor 508 can write the hash table to the address scrambling 524 circuit in one or several writes.

Once the hypervisor 508 has determined the scrambling pattern for virtual machine 506, the hypervisor 508 can write the pattern to the address scrambling 524 circuit. In some implementations, the address scrambling 524 circuit can receive the write from the host 502 over a communication channel with the host 502. For example, as discussed above, the address scrambling 524 circuit can be in the path of a communication channel between the host 502 and storage class memory. In this example, the communication channel can be used to program the address scrambling 524 circuit, in addition to being used to transmit read and write transactions to the storage class memory.

In other examples, the address scrambling 524 can receive the configuration write from the host 502 over a communication fabric that is internal to the memory controller. In these examples, another component of the memory controller may receive the configuration write, and can send it on to the address scrambling 524 circuit.

In various implementations, the address scrambling 524 can include a fabric interface 530 for receiving configuration writes. As discussed above, through the fabric interface 530, the address scrambling 524 can direct the configuration writes to a mux select configuration memory (or a hash tables memory).

In some implementations, the memory controller can include multiple address scrambling circuits. For example, the memory controller can have an address scrambling circuit for each communication link with the host processor. In these cases, the hypervisor 508 can write a scrambling pattern for a particular virtual machine identifier to one or more of the address scrambling circuits. In this way, transactions from any one virtual machine can be scrambled when transferred over all communication channels, or only on some communications channels.

The example method of FIG. 5 can be used in cases where it is desired for the memory controller to be less complex or to have a smaller size. In this example, no hardware is needed to generate scrambling patterns. This example can also be used where security is less of a concern. Enabling the hypervisor 508 to determine and program scrambling patterns can mean that, should the hypervisor 508 become compromised, the scrambling patterns can be derived or read from the address scrambling 524. In some situations, compromise of the hypervisor may not be likely.

Figure 6:
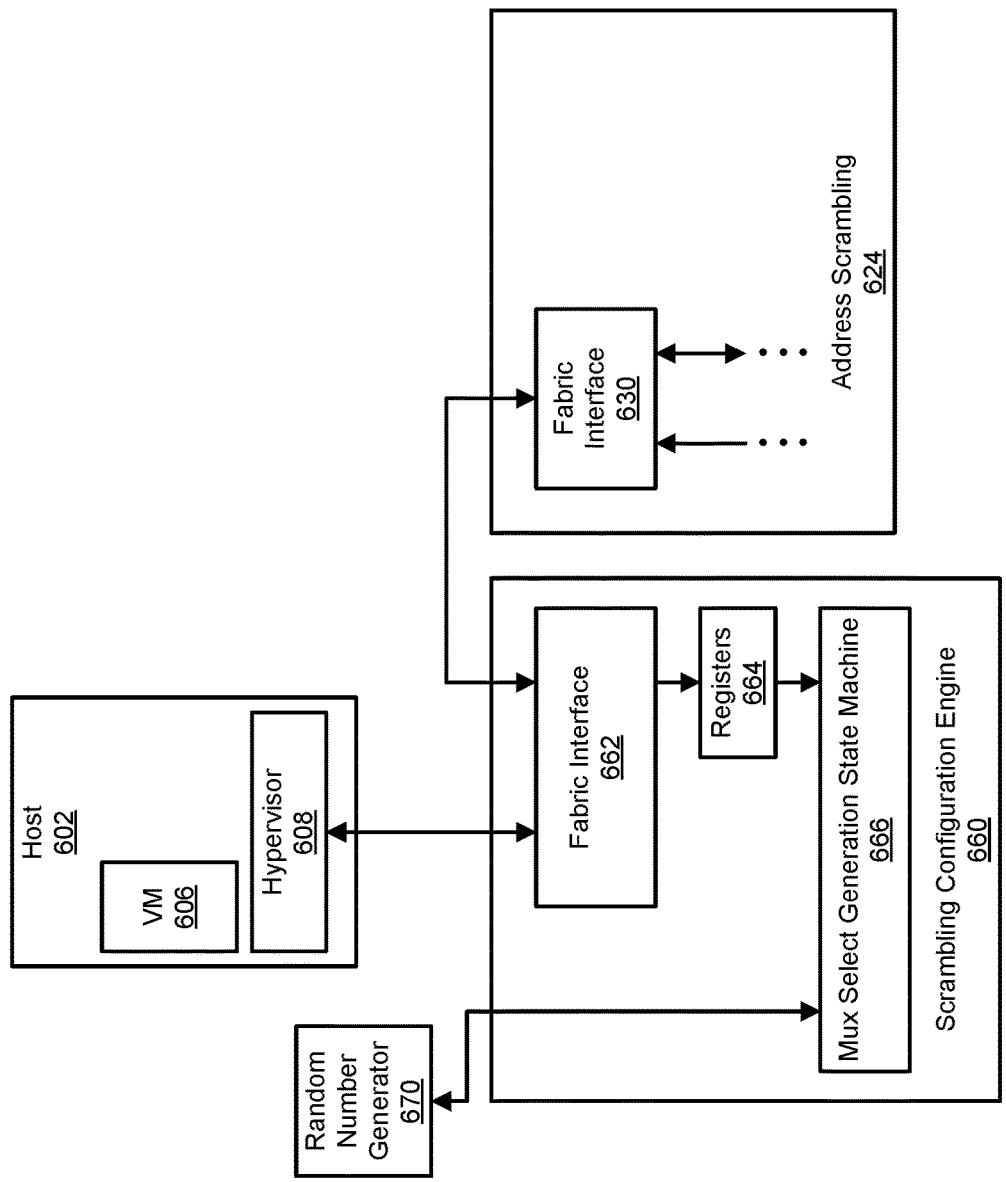
FIG. 6 illustrates another example of a method by which an address scrambling circuit can be configured.

FIG. 6 illustrates another example of a method by which an address scrambling 624 circuit can be configured. The address scrambling 624 can be part of a memory controller that manages multiple banks of storage class memory. In this example, the memory controller includes a scrambling configuration engine 660, an additional circuit for configuring the address scrambling 624 circuit. The scrambling configuration engine 660, upon receiving a request from a hypervisor 608 running on a host 602, can generate new scrambling patterns. In this configuration, the host 602 does not have direct access to the scrambling patterns, and software (such as the hypervisor 608) is not able to read the scrambling patterns. In this way, an added level of security is provided. In the example of FIG. 6, components of the address scrambling 624 circuit have been omitted, for clarity.

The example scrambling configuration engine 660 includes a mux select generation state machine 666 that can generate random patterns to be used as select inputs for the address muxing blocks of the address scrambling 624 circuit. The scrambling configuration engine 660 can also include one or more registers 664 that can be used to configure the operation of the mux select generation state machine 666 or request for the mux select generation state machine 666 to generate a pattern. The scrambling configuration engine 660 can also include a fabric interface 662 for communicating with a host 602 and/or the fabric interface 630 of the address scrambling 624 circuit.

In the example of FIG. 6, when a hypervisor 608 executing in a host 602 environment launches a new virtual machine 606, the hypervisor 608 can inform the scrambling configuration engine 660. For example, the hypervisor 608 can write a register 664 that indicates to the scrambling configuration engine 660 that a new virtual machine 606 is active and needs a new scrambling pattern. In some implementations, the write to the register 664 can include a virtual machine identifier for the virtual machine 606. In some implementations, the write to the register 664 can indicate to the scrambling configuration engine 660 to copy a scrambling pattern from another virtual machine, and use this scrambling pattern for the new virtual machine 606. In these implementations, the write to the register 664 can include a virtual machine identifier for the virtual machine from which to copy a scrambling pattern.

In various implementations, a register 664 can also store a template for the scrambling pattern, which can identify for the mux select generation state machine 666 which bits to scramble, which bits to leave unscrambled, and/or where, in the output scrambled address, the bits of an input address should go. In some implementations, the hypervisor 608 can program the template at boot time, and/or at a later time. In some implementations, the registers 664 can include a default template that can be used if the hypervisor 608 does not configure the template. In some implementations, the registers 664 can include a different template for each virtual machine that can be supported by the system.

In some implementations, the template can indicate that a part of an address should be scrambled according to a global pattern. The global pattern, which can be determined by the mux select generation state machine 666 at the request of the hypervisor 608, can be applied to all addresses, regardless of the virtual machine to which the address belongs. That is, the global pattern provides that at least a part of all addresses will be scrambled the same way. The scrambling pattern for any particular virtual machine can include the global pattern and possibly also a virtual machine-specific pattern.

A write to the registers 664 can trigger the mux select generation state machine 666 to start. The mux select generation state machine 666 can output, assuming, for example, a 64-bit address, a scrambling pattern that includes 64 values that indicate which bit from an input address should be used for a bit in the output scrambled address. For example, the scrambling pattern can indicate that a value for bit 6 of the scrambled address should be taken from bit 12 of the input address and that a value for bit 7 of the scrambled address should be taken from bit 9 of the input address.

An example of a method the mux select generation state machine 666 can use to generate the scrambling pattern is as follows: the mux select generation state machine 666 can, for each bit or group of bits in an address, determine whether the bit should be scrambled. Using a random number, the mux select generation state machine 666 can then select a bit or bits from a set of bits that are identified as candidates. For example, when considering bit 6, the set of candidate bits can be bits [13:8]. In this example, once the mux select generation state machine 666 has selected a bit from the set of candidate bits, the selected bit is removed from the set.

Another example of a method the mux select generation state machine 666 can use to generate the scrambling pattern is as follows: the mux select generation state machine 666 can consider a group of bits, for example bits [13:8], and determine whether the bits should be scrambled. When the bits should be scrambled, the mux select generation state machine 666 can put the bit locations (e.g., bits 8 through 13, in this example) in a random order. When the groups of bits are to be in a different location in the output scrambled address, the mux select generation state machine 666 can also shift the bit locations. For example, when bits [13:8] are to be in bit positions [11:6] in the output scrambled address, the mux select generation state machine 666 can subtract two from each bit location.

Once the mux select generation state machine 666 has determined the scrambling pattern, the mux select generation state machine 666 can write the pattern to the address scrambling 624 circuit. In some implementations, the fabric interface 662 of the scrambling configuration engine 660 and the fabric interface 630 of the address scrambling 624 circuit can communicate over the internal communication fabric of the memory controller 210, the same communication fabric used for inter-communication between other components of the memory controller 210. In some implementations, for added security, the fabric interface 662 of the scrambling configuration engine 660 and the fabric interface 630 of the address scrambling 624 circuit can have a private communication channel that can only be used by the scrambling configuration engine 660 and the address scrambling 624 circuit.

In various implementations, the mux select generation state machine 666 can use random numbers when determining the scrambling pattern. Random number generators are a common component of operating systems, and in some implementations, the mux select generation state machine 666 can obtain random numbers from the hypervisor 608. For added security, however, in some implementations, the memory controller can include a random number generator 670 circuit. In these implementations, the mux select generation state machine 666 can send requests over the internal communication fabric to the random number generator 670. The random number generator 670 can produce, for example, 128-bit random numbers.

In some implementations, the memory controller can include multiple address scrambling circuits. For example, the memory controller can have an address scrambling circuit for each communication link with the host processor. In these cases, the scrambling configuration engine 660 can write a scrambling pattern for a particular virtual machine identifier to one or more of the address scrambling. In this way, transactions from any one virtual machine can be scrambled when transferred over all communication channels, or only on some communications channels.

In various implementations, once the scrambling configuration engine 660 has configured the address scrambling 624 circuit, the scrambling configuration engine 660 can inform the hypervisor 608, for example by setting a status bit in a register 664, which can be read by the hypervisor 608.

Though not illustrated here, in various implementations, the scrambling configuration engine 660 can alternatively or additionally generate hash tables for the address scrambling 624. In these implementations, the registers 664 can include, for example, a width (in bits) for the hash tables, which can also indicate the number of entries in the table. For example, when the bit width is four bits, the table will have sixteen entries. (2^4). To populate a hash table for a particular virtual machine, the mux select generation state machine 666 can use a random number to put values in the table in a random order. For example, when the hash table has sixteen entries, the mux select generation state machine 666 can put the numbers 0 through 15 in the table in a random order. In various implementations, the hypervisor 608 can program a register 664 with a pattern that can indicate which bits in an address hashing should be applied to. The mux select generation state machine 666 can write the hash table and the pattern to the address scrambling 624.

Figure 7:
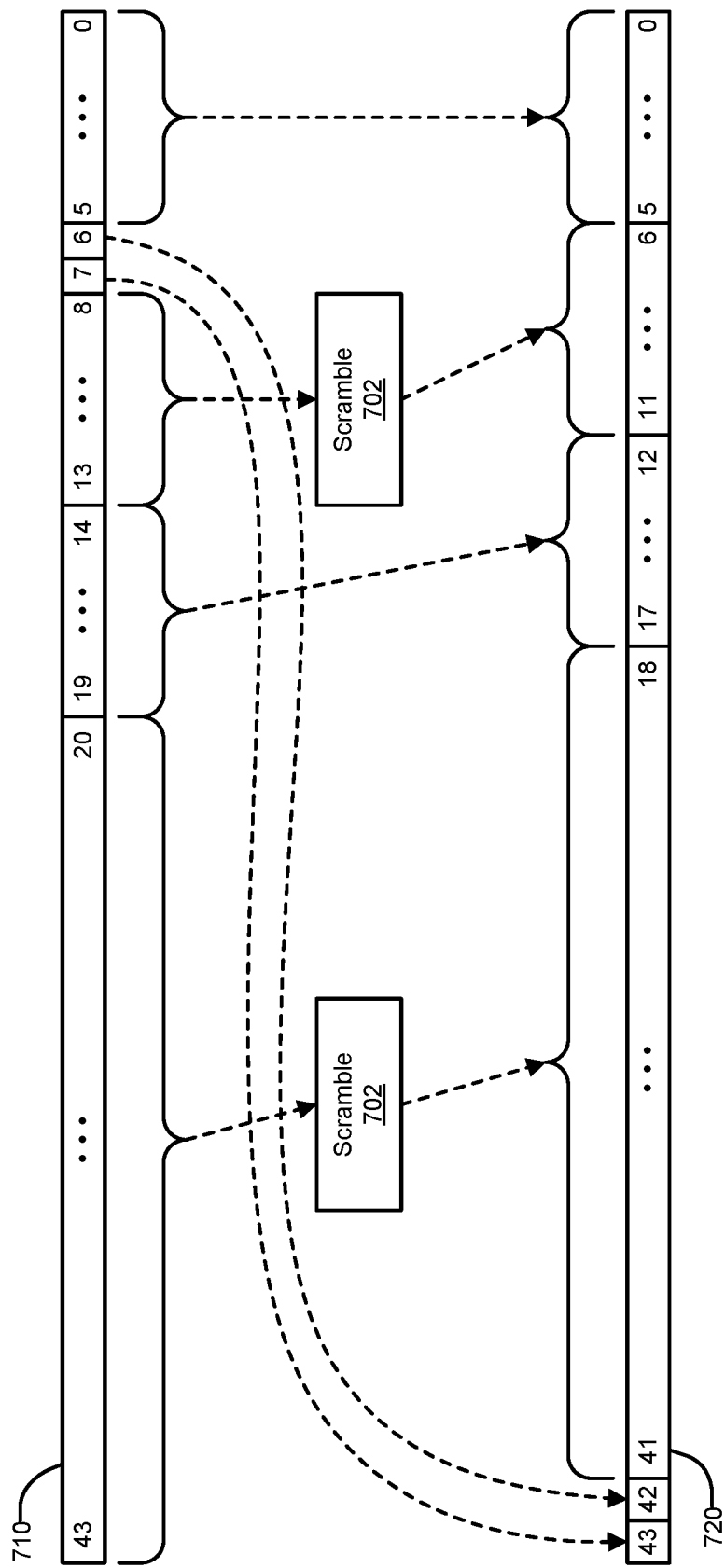
FIG. 7 illustrates an example of an address scrambling pattern.

FIG. 7 illustrates an example of an address scrambling pattern. As discussed below, the example pattern is configured to accomplish several specific objectives for a particular system. In other examples, the system can have a different configuration, other objectives can be defined, and different patterns can be determined that meet those objectives.

In the example of FIG. 7, the system is assumed to have 16 TB of storage class memory, managed by four memory channels, so that each memory channel manages 4 TB. The block size of the storage class memory is 4 kilobytes (KB). For this system, the following objectives can be defined. First, cache lines (e.g., a set of contiguous data that can be 64, 128, or some other number of bits long) are to be distributed between the four memory channels, so that, when cache lines are read sequentially, the cache lines are read from different memory channels. The first objective can improve overall read performance. Second, for security, selection of a 1 megabyte (MB) pages should be scrambled, meaning that addresses that would otherwise be within the same 1 MB page are more likely than not to be in different 1 MB pages. This scrambling should apply to all addresses from all virtual machines. Third, addresses within the 1 MB page should use blocks in linear order, which can provide better performance. Fourth, also for security, cache lines within a 4 KB block should be scrambled. This scrambling should be applied on a per-virtual machine identifier basis.

To accomplish these objectives, a scrambled address 720 can be determined for a 44-bit input address 710 as follows. First, in this example, cache lines are 64 bits in length. To avoid scrambling within a cache line, bits [5:0] are copied, without modification, from the input address 710 to the scrambled address 720.

Second, to make sequential cache lines map to the four different memory channels, bits [7:6] of the input address 710 are copied to bits [43:42] of the scrambled address 720. As noted above, the memory channels each manage 4 TB, and 4 TB chunks can be selected using bits [43:42].

Third, to scramble addresses within a 4 KB block, bits [13:8] of the input address 710 can be scrambled (e.g., using a scramble 702 function) and moved to bits [11:6] of the scrambled address 720 because bits [11:6] select 4 KB segments of memory. The scramble 702 function can determine which of bits [13:8] in the input address 710 to copy into each of bits [11:6] in the scrambled address 720. For example, the scramble 702 function can determine that bits 13, 8, 12, 11, 10, 9 of the input address 710 should correspond to bits 11, 10, 9, 8, 7, 6 of the scrambled address 720. The scramble 702 function can use muxing or hash tables, as described above. Additionally or alternatively, the scramble 702 function can use, for example, a version of a Fisher-Yates shuffle algorithm, which can be adjusted for when the number of bits being scrambled is not a power of two. Scrambling of bits [13:8] of the input address 710 into bits [11:6] of the scrambled address 720 can be specific to each virtual machine, meaning that the scramble 702 function can output a different pattern for each virtual machine (for example, using random numbers to determine the scrambling order).

Fourth, to ensure that addresses within a 1 MB page use 4 KB blocks sequentially, bits [19:14] of the input address 710 can be copied to bits [17:12] of the scrambled address 720 without modification.

Fifth, to scramble addresses within a 1 MB page, bits [43:20] of the input address 710 can be scrambled into bits [41:18] of the scrambled address 720. As noted above, the scrambling pattern for bits [41:18] can be the same for all virtual machines.

In some implementations, a hypervisor can determine default input address 710 to scrambled address 720 mapping, that is, which bits of the input address 710 will be copied to the bits of input address 710. For example, in the illustrated example, bits [5:0] of the input address 710 map to bits [5:0] of the scrambled address 720, bits [7:6] of the input address 710 map to bits [43:42] of the scrambled address 720, bits [13:8] of the input address 710 map to bits [11:6] of the scrambled address 720, bits [19:14] of the input address 710 map to bits [17:12] of the scrambled address 720, and bits [43:20] map to bits [41:18] of the scrambled address 720. In these implementations, the hypervisor can write the default mapping to the address scrambling circuit and/or to a scrambling configuration engine.

In some implementations, the hypervisor can also configure any global scrambling pattern. For example, the hypervisor can trigger the scrambling configuration engine to generate a scrambling pattern for a particular set of bits (e.g., bits [43:20] of the input address 710, in the illustrated example). In this example, once the scrambling pattern is ready, the scrambling configuration engine can write the scrambling pattern to the address scrambling circuit. In some implementations, the hypervisor must wait until this process is done before allowing any accesses to the storage class memory.

In various implementations, the hypervisor can follow a similar process to generate scrambling patterns for specific virtual machines. For example, when a new virtual machine starts up, the hypervisor can trigger the scrambling configuration engine to generate a scrambling pattern for a set of bits designated as specific to a virtual machine (e.g., bits [13:8] of the input address 710 in the illustrated example). Once the scrambling pattern is ready, the scrambling configuration engine can write the pattern to the address scrambling circuit. In some implementations, the hypervisor must wait until the address scrambling circuit is updated before allowing the virtual machine to access storage class memory. In some implementations, to ensure a higher degree of security, the hypervisor may not be able to read the virtual machine-specific scrambling pattern.

As noted above, in some cases, the hypervisor can have the scrambling configuration engine copy a scrambling pattern previously determined for another virtual machine. This allows multiple virtual machines to use the same scrambling pattern.

Figure 8:
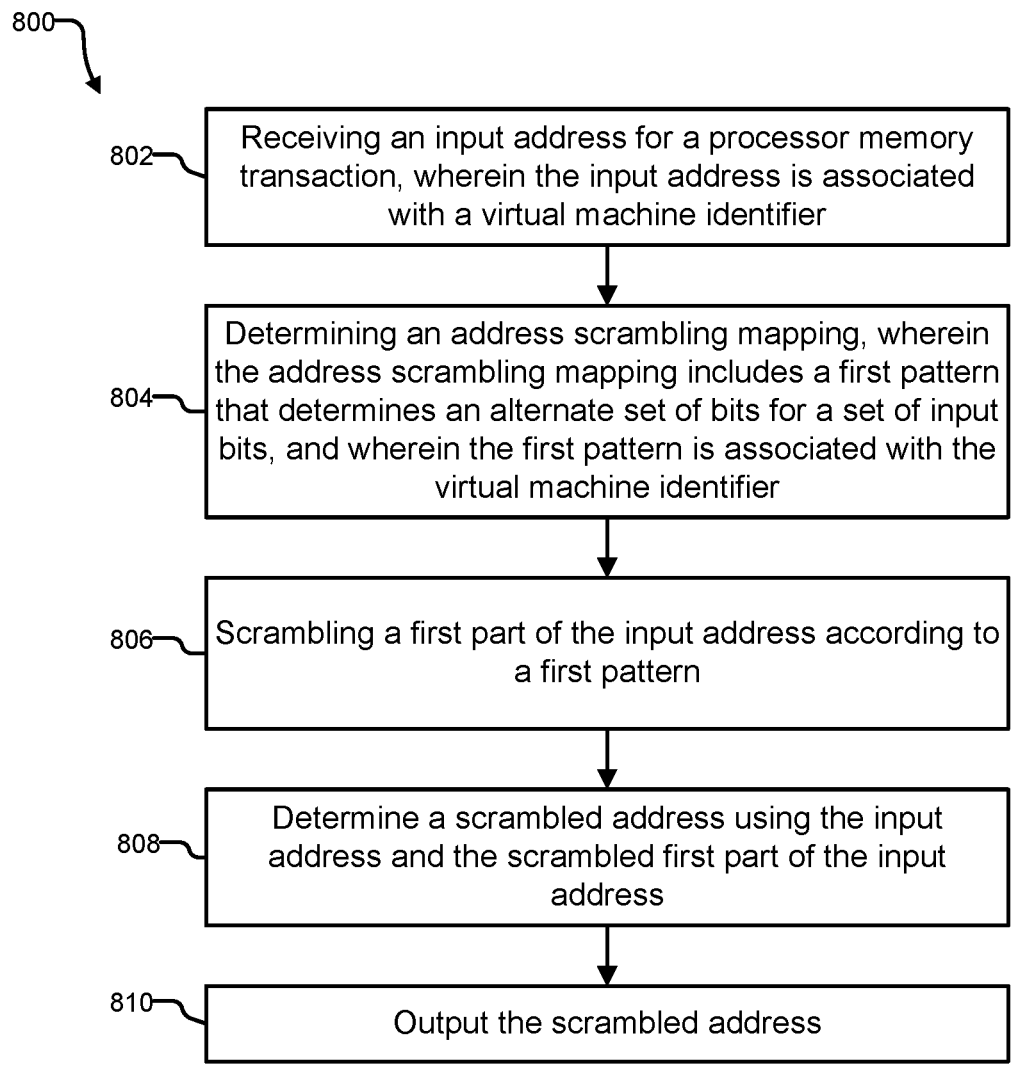
FIG. 8 illustrates an example of a process for producing a scrambled address from an input address.

FIG. 8 illustrates an example of a process 800 for producing a scrambled address from an input address. The process 800 can be implemented by an address scrambling circuit, as described above.

At step 802, the process 800 includes receiving an input address for a processor memory transaction, wherein the input address is associated with a virtual machine identifier. The processor memory transaction can be a read transaction or a write transaction to processor memory. In some implementations, the processor memory can be storage class memory.

At step 804, the process 800 includes determining an address scrambling mapping, wherein the address scrambling mapping includes a first pattern that determines an alternate set of bits for a set of input bits, and wherein the first pattern is associated with the virtual machine identifier. In some examples, the alternate set of bits is determined by swapping bits from the set of input bits. Swapping can be accomplished, for example, using a multiplexor. In some examples, the alternate set of bits is determined by inputting the set of input bits into a hash function, and using the output of the hash function to select the alternate set of bits from a table.

At step 806, the process 800 includes scrambling a first part of the input address. By being associated with the virtual machine identifier, the first pattern applies only to input addresses assigned to the virtual machine identifier In some examples, the first part of the input is associated with a range of bits in the input address, and the scrambled first part of the input address is copied into a different range of bits in the scrambled address or into a same range of bits in the scrambled address. The range of bits to which the scrambled bit are copied can be determined from the first pattern.

In some examples, a third part of the input address can be scrambled according to a third pattern. In these examples, the third pattern distributes processor memory transactions between multiple sets of memory channels.

At step 808, the process 800 includes determining a scrambled address using the input address and the scrambled first part of the input address. In some examples, an address scrambling mapping can be used to determine which bits of the input address map to the bits of the scrambled address. In some examples, a part of the input address is copied to the scrambled address without modifications. In these examples, the part is associated with a range of bits in the input address, and can be copied to a same range of bits in the scrambled address or a different range of bits in the scrambled address.

At step 810, the process includes outputting the scrambled address. In various examples, the scrambled address can be used to access processor memory, either directly, or indirectly. Indirect use can occur, for example, when the scrambled address is translated by an address translation circuit, and the translated address is used to access processor memory.

In some examples, the address scrambling mapping includes a second pattern that applies to all transaction addresses. In these examples, the process 800 can further include scrambling a second part of the input address using the second pattern. The scrambled second part of the input address can also be used to determine the scrambled output address. The second part of the input address may or may not overlap with the first part of the input address.

Figure 9:
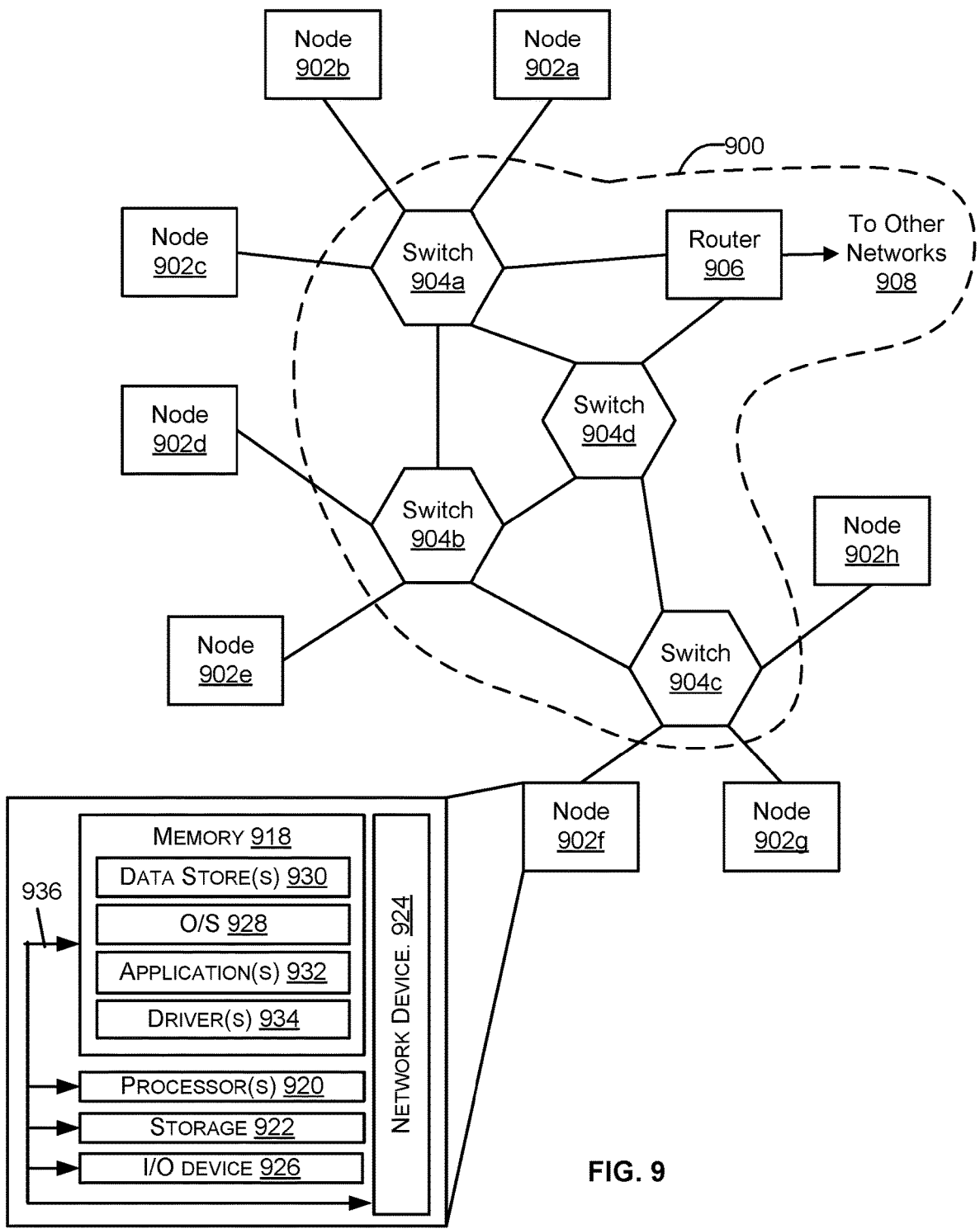
FIG. 9 illustrates an example architecture for features and systems described herein that includes one or more service provider computers and/or a user device connected via one or more networks, according to certain aspects of the disclosure.

FIG. 9 illustrates a network 900, illustrating various different types of network devices, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device (s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, a bus interface module may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An address scrambling circuit for a memory controller, comprising:
   a memory storing a plurality of address scrambling mappings; and
   a scrambling circuit coupled to an address scrambling configuration engine;
   wherein the address scrambling circuit is configured to:
      receive an input address for a processor memory transaction, wherein the input address is associated with a virtual machine identifier;
      determine, using the virtual machine identifier, an address scrambling mapping from the plurality of address scrambling mappings, wherein the address scrambling mapping includes a first pattern that determines an alternate set of bits for a set of input bits, and wherein the first pattern is associated with the virtual machine identifier;
      scramble, using the scrambling circuit and the first pattern, a first part of the input address;
      determine a scrambled address using the input address and the scrambled first part of the input address; and
      output the scrambled address;
   wherein the address scrambling configuration engine is configured to:
      receive a new virtual machine identifier;
      generate a new pattern, wherein the new pattern is associated with the new virtual machine identifier;
      write the new pattern to the memory using the new virtual machine identifier, and
      determine a new address scrambling mapping that includes the new pattern.

2. The address scrambling circuit of claim 1, wherein the address scrambling configuration engine is further configured to:
   request a random number from a random number generation circuit, wherein the new pattern is generated using the random number.

3. The address scrambling circuit of claim 1, wherein the new pattern is copied from the first pattern.

4. The address scrambling circuit of claim 1, wherein the memory is inaccessible to software applications.

5. The address scrambling circuit of claim 1, wherein the processor memory transaction is a transaction to processor memory, and wherein the processor memory is storage class memory.

6. The address scrambling circuit of claim 1, wherein the first pattern corresponds to a range of bits in the scrambled address, wherein the range of bits identifying addresses within a same block of processor memory.

7. The address scrambling circuit of claim 1, wherein scrambling the first part of the input address includes modifying and placing a range of bits from the first part of the input address into a different range of bits in the scrambled address.

8. The address scrambling circuit of claim 1, wherein scrambling the first part of the input address includes modifying and placing a range of bits from the first part of the input address into a same range of bits in the scrambled address.

9. The address scrambling circuit of claim 1, wherein scrambling the first part of the input address includes copying a range of bits from the first part of the input address into the scrambled address without modification.

10. The address scrambling circuit of claim 1, wherein the alternate set of bits is determined by swapping bits from the set of input bits.

11. The address scrambling circuit of claim 1, wherein the alternate set of bits is determined by inputting the set of input bits into a hash function and using an output of the hash function to select the alternate set of bits from a table.

12. A computer-implemented method, comprising:
   receiving, by an address scrambling circuit of a memory controller, an input address for a processor memory transaction, wherein the input address is associated with a virtual machine identifier;
   determining an address scrambling mapping, wherein the address scrambling mapping includes a first pattern and a second pattern, wherein the first pattern determines an alternate set of output bits for a set of input bits, and wherein the first pattern is associated with the virtual machine identifier, and wherein the second pattern applies to all transaction addresses;
   scrambling a first part of the input address according to the first pattern;
   scrambling a second part of the input address using the second pattern;
   determining a scrambled address using the input address the scrambled first part of the input address, and the scrambled second part of the input address; and
   outputting the scrambled address.

13. The computer-implemented method of claim 12, wherein scrambling the first part of the input address includes modifying and placing a range of bits from the first part of the input address into the scrambled address.

14. The computer-implemented method of claim 12, wherein scrambling the first part of the input address includes copying a range of bits from the first part of the input address into the scrambled address without modification.

15. The computer-implemented method of claim 12, further comprising:
scrambling a third part of the input address according to a third pattern, wherein the third pattern distributes processor memory transactions between multiple sets of memory channels.

16. An address scrambling circuit for a memory controller, comprising:
a memory storing a plurality of address scrambling mappings; and
a scrambling circuit;
wherein the address scrambling circuit is configured to:
receive an input address for a processor memory transaction, wherein the input address is associated with a virtual machine identifier;
determine, using the virtual machine identifier, an address scrambling mapping from the plurality of address scrambling mappings, wherein the address scrambling mapping includes a first pattern and a second pattern, wherein the first pattern determines an alternate set of bits for a set of input bits and is associated with the virtual machine identifier, and wherein the second pattern applies to all transaction addresses;
scramble, using the scrambling circuit and the first pattern, a first part of the input address;
scramble, using the scrambling circuit and the second pattern, a second part of the input address;
determine a scrambled address using the input address, the scrambled first part of the input address, and the scrambled second part of the input address; and
output the scrambled address.

17. The address scrambling circuit of claim 16, wherein the second pattern distributes transactions between multiple sets of processor memory channels.

\* \* \* \* \*